(No Model.)
T. MARTIN, F. PRIESTLEY & L. D. PIERSON.
ROTARY ENGINE.
No. 516,542. Patented Mar. 13, 1894.
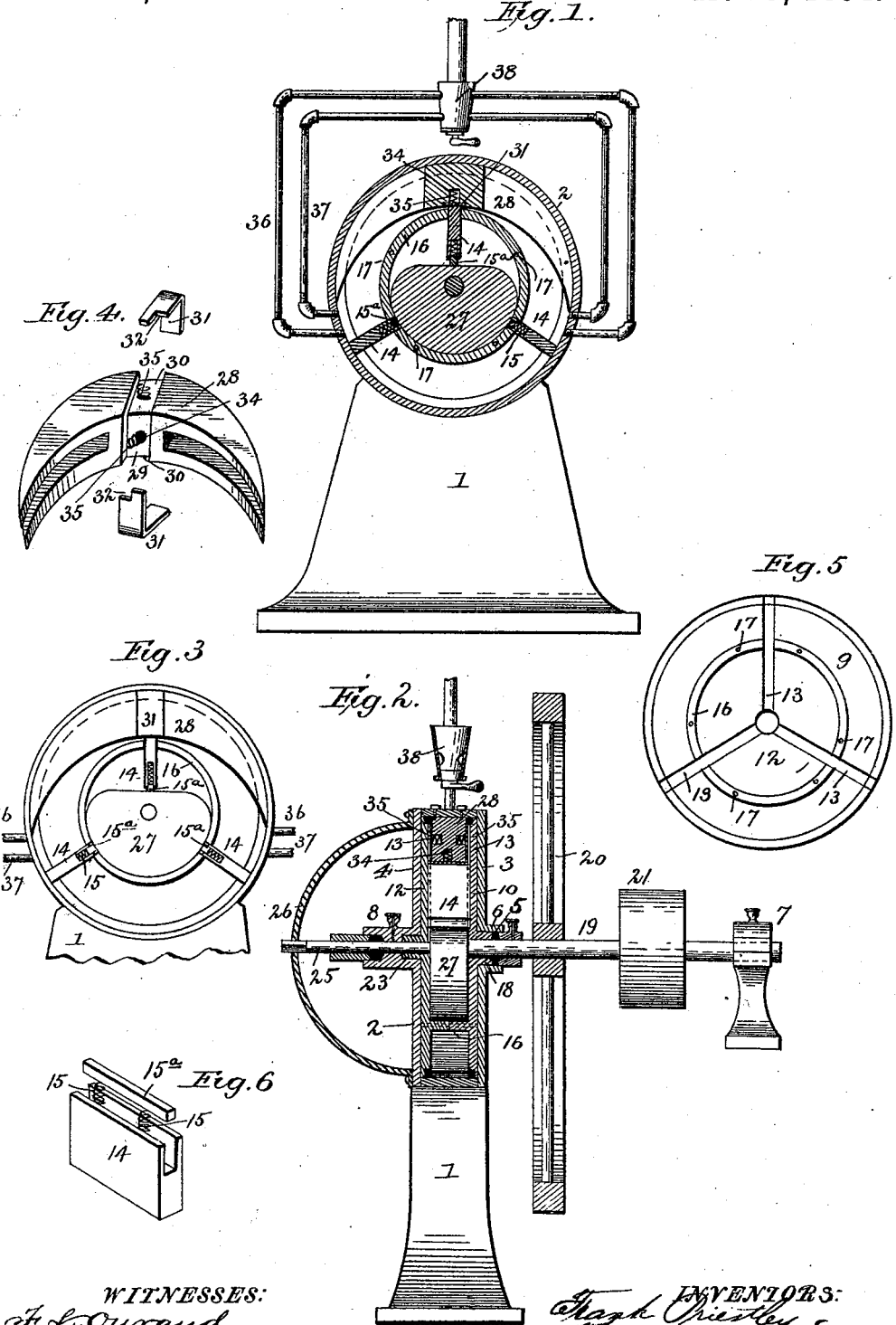

UNITED STATES PATENT OFFICE.

THOMAS MARTIN, FRANK PRIESTLEY, AND LEROY D. PIERSON, OF MAPLETON, IOWA.

ROTARY ENGINE.

SPECIFICATION forming part of Letters Patent No. 516,542, dated March 13, 1894.

Application filed April 15, 1893. Serial No. 470,570. (No model.)

*To all whom it may concern:*

Be it known that we, THOMAS MARTIN, FRANK PRIESTLEY, and LEROY D. PIERSON, citizens of the United States, residing at Mapleton, Iowa, have invented certain new and useful Improvements in Rotary Engines, of which the following is a full, clear, and exact description.

The object of the invention is to provide an improved construction of rotary engine which shall possess superior advantages with respect to efficiency in operation.

The invention consists in the novel construction and combination of parts as hereinafter fully described and claimed.

In the accompanying drawings—Figure 1 is a central transverse section of a rotary engine constructed in accordance with our invention. Fig. 2 is a longitudinal sectional view of the same. Fig. 3 is a side view of the cylinder, one of the heads thereof, and one of the disks comprising the piston head being removed. Fig. 4 is a detail view of the outer, crescent shaped cam and the angular packing plates. Fig. 5 is an inner face view of one of the piston heads. Fig. 6 is a detail view of one of the pistons.

In the said drawings, the reference numeral 1 designates the base of the engine, on which is mounted a stationary cylinder 2, provided with heads 3 and 4, one of which 3, is formed with a central aperture 5, a hub 6, and a journal bearing 7. The other head 4, is formed with a hub or bearing 8. Located within this cylinder is a piston head 9, consisting of two disks 10 and 12, formed with peripheral grooves to receive a suitable packing material. On their inner faces these disks are formed with a series of radial grooves 13, to receive the radially movable pistons 14, each consisting of a rectangular plate, connected by means of coiled springs 15, with a bar 15ª, also fitting in said grooves. About midway between the axis and periphery, these disks are formed with an annular concentric flange 16, also grooved at the points where the grooves 13 intersect the same. These disks are secured together by means of bolts 17, passing therethrough and through apertures in said flanges. One of these disks 10, on its outer face is formed with a boss 18, which seats in the hub 6, and has securely fixed therein the driving shaft 19, provided with fly wheel 20, and pulley 21. The other disk 12, is formed with a sleeve or journal 23, provided with a governor pulley, not shown. Passing through this sleeve 23, is a rod 25, the outer end of which is connected with an arch strap 26, secured to the cylinder 2. Upon its inner end said rod is provided with a stationary cam 27, securely fixed thereto. This cam is located in the lower part of the chamber formed by the flanges 16.

The numeral 28, designates a crescent shaped cam, the outer side of which is concentric with the rim of cylinder 2, to which it is bolted or otherwise secured. The concave or inner side of this cam is eccentric to the axis of the cylinder, and it is located between the disks 10 and 12 of the piston head. Upon its inner face and at the center, the cam 28 is formed with a groove 29, and also with grooves 30, at its sides. In these grooves are seated angular packing blocks 31, having their meeting ends cut away as seen at 32, so as to form overlapping joint. The side grooves 30 are formed with apertures 34, to receive coiled springs 35, which serve to expand the blocks and press them closely against the piston head.

The numeral 36, designates a steam supply pipe and 37, exit pipe. As shown there are two sets of these pipes connected with a five-way valve 38. The pipes communicate with the cylinder at opposite sides.

The operation will be readily understood. When steam is admitted to the cylinder, it will act on the pistons, rotating the piston head, and escaping through the exhaust at the opposite side. As the pistons pass the exhaust they will engage with the outer cam and force it inward. The inner cam forces the pistons out so that they will be acted on by the steam.

Having thus described our invention, what we claim is—

1. In a rotary engine the combination with the cylinder having inlet and exhaust ports, of the piston head having radial grooves and an annular flange, the stationary cam located within said flange, having a stem connected with the arch strap secured to the cylinder, the bosses and journal bearings secured to or formed with said piston head, the outer crescent shaped cam secured to the rim of the cylinder, and the spring actuated pistons, substantially as described.

2. In a rotary engine, the combination with the cylinder having inlet and exhaust ports, the piston head having radial grooves and an annular flange, the stationary cam located within said flange, having a stem connected with the arch strap secured to the cylinder and the bosses and journal bearings secured to or formed with said piston head, of the outer crescent shaped cam secured to the rim of the cylinder having grooves in its sides and inner face at the center thereof, the angular packing blocks having their ends cut away and overlapping each other and the coiled springs seated in apertures in the outer cam and bearing against said blocks, substantially as described.

THOMAS MARTIN.
FRANK PRIESTLEY.
L. D. PIERSON.

Witnesses:
C. E. COOPER,
JOHN BUCKIO.